United States Patent
Neubauer et al.

(10) Patent No.: US 12,097,818 B2
(45) Date of Patent: Sep. 24, 2024

(54) METHOD, COMPUTER-READABLE MEDIUM, SYSTEM AND VEHICLE COMPRISING THE SYSTEM FOR PROVIDING ACCIDENT PARAMETERS TO A PERSON OUTSIDE A VEHICLE FOLLOWING AN ACCIDENT INVOLVING THE VEHICLE

(71) Applicant: Bayerische Motoren Werke Aktiengesellschaft, Munich (DE)

(72) Inventors: Michael Neubauer, Neuried (DE); Ludwig Drees, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 127 days.

(21) Appl. No.: 17/781,350

(22) PCT Filed: Oct. 21, 2020

(86) PCT No.: PCT/EP2020/079614
§ 371 (c)(1),
(2) Date: May 31, 2022

(87) PCT Pub. No.: WO2021/160302
PCT Pub. Date: Aug. 19, 2021

(65) Prior Publication Data
US 2023/0001871 A1 Jan. 5, 2023

(30) Foreign Application Priority Data
Feb. 14, 2020 (DE) ..................... 10 2020 103 851.8

(51) Int. Cl.
*B60Q 1/00* (2006.01)
*B60Q 1/50* (2006.01)
(Continued)

(52) U.S. Cl.
CPC .............. *B60R 21/00* (2013.01); *B60Q 1/503* (2013.01); *B60Q 1/52* (2013.01); *H04W 4/40* (2018.02); *B60R 2021/0027* (2013.01)

(58) Field of Classification Search
CPC ............ B60R 21/00; B60R 2021/0027; B60R 21/0173; B60R 21/0136; B60Q 1/503;
(Continued)

(56) References Cited

U.S. PATENT DOCUMENTS 9,773,281 B1 9/2017 Hanson
11,068,995 B1 * 7/2021 Potter ..................... G08B 21/02
(Continued)

FOREIGN PATENT DOCUMENTS

DE 102005037155 A1 2/2007
DE 102011080107 A1 2/2012
(Continued)

OTHER PUBLICATIONS

International Search Report corresponding to International Patent Application No. PCT/EP2020/079614, dated Dec. 1, 2020 (6 pages).
(Continued)

*Primary Examiner* — Tai T Nguyen
(74) *Attorney, Agent, or Firm* — Maginot, Moore & Beck LLP

(57) ABSTRACT

A method for providing accident parameters to a person outside a vehicle after an accident includes ascertaining a first accident parameter that is representative of the severity and/or a consequence severity using a control unit of the vehicle, and determining a display device of the vehicle that can display the first accident parameter following the accident. The first accident parameter is provided on the determined display, and a second accident parameter that is representative of the severity and/or the accident consequence severity is ascertained. The method also includes
(Continued)

receiving a release signal for the second accident parameter from the person outside the vehicle following the accident involving the vehicle, and verifying the release signal for the second accident parameter using the control unit of the vehicle. The second accident parameter is provided on the determined display if the release signal was successfully verified by the control unit of the vehicle.

20 Claims, 1 Drawing Sheet

(51) Int. Cl.
  *B60Q 1/52* (2006.01)
  *B60R 21/00* (2006.01)
  *H04W 4/40* (2018.01)

(58) Field of Classification Search
  CPC .......... B60Q 1/52; H04W 4/40; H04W 12/08; H04W 4/023; H04W 4/44; H04W 4/90; H04L 63/102; H04L 67/52; H04L 67/12
  USPC ...................................... 340/425.5
  See application file for complete search history.

(56) References Cited

U.S. PATENT DOCUMENTS

| 2007/0159309 | A1 | 7/2007 | Ito et al. |
| 2015/0039397 | A1* | 2/2015 | Fuchs ................ G06Q 30/0283 |
| | | | 705/7.35 |
| 2018/0293401 | A1 | 10/2018 | Weimerskirch |
| 2021/0266732 | A1* | 8/2021 | Zhou ..................... H04L 9/3073 |
| 2021/0326909 | A1* | 10/2021 | Kass .................. G06Q 10/0637 |

FOREIGN PATENT DOCUMENTS

| DE | 102015215294 A1 | 2/2017 |
| DE | 102018003108 A1 | 10/2018 |
| DE | 102017115277 A1 | 1/2019 |
| DE | 102016200796 A1 | 10/2020 |

OTHER PUBLICATIONS

German Search Report corresponding to German Patent Application No. 10 2020 103 851.8, dated Sep. 1, 2020 (5 pages).

* cited by examiner

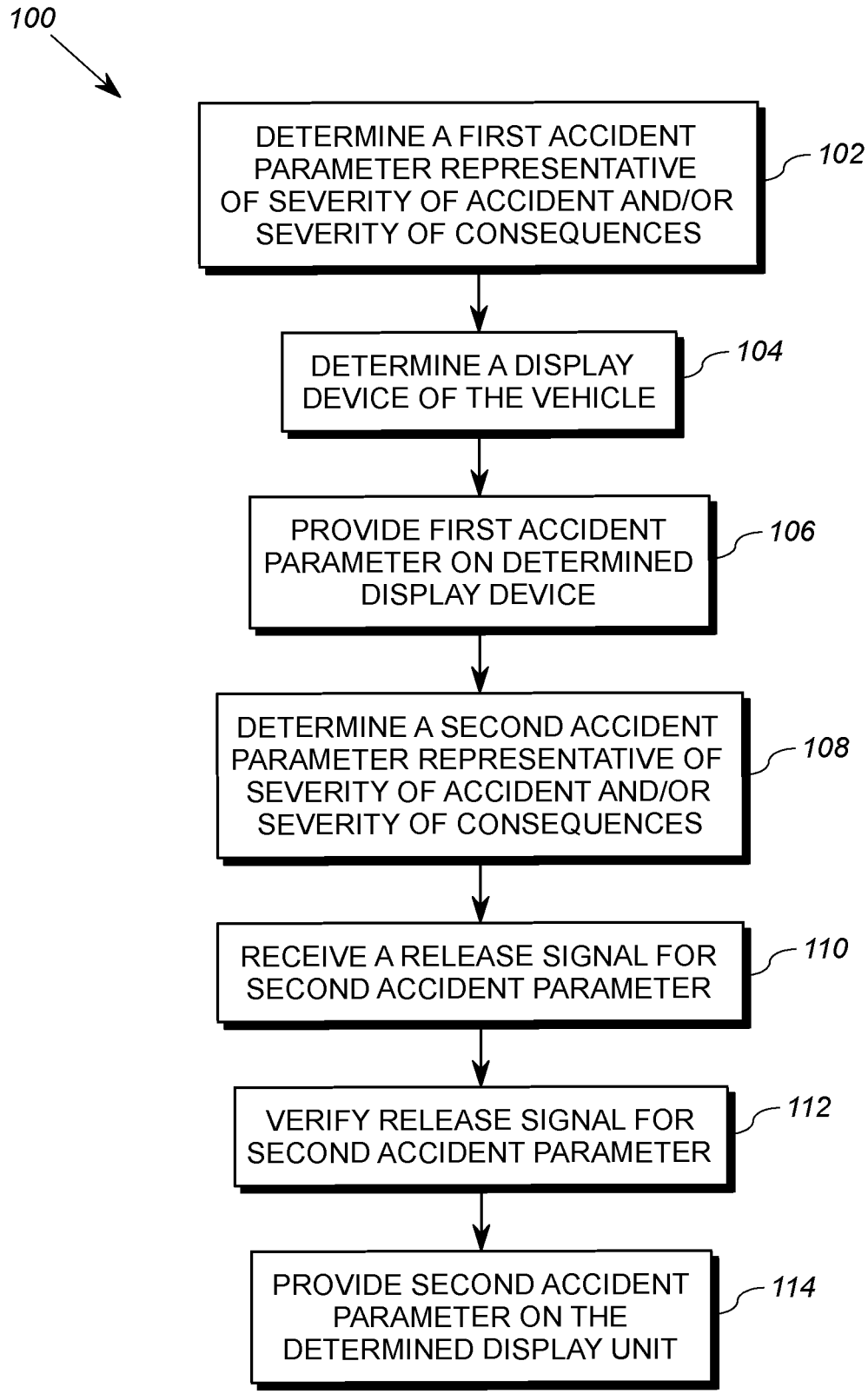

METHOD, COMPUTER-READABLE MEDIUM, SYSTEM AND VEHICLE COMPRISING THE SYSTEM FOR PROVIDING ACCIDENT PARAMETERS TO A PERSON OUTSIDE A VEHICLE FOLLOWING AN ACCIDENT INVOLVING THE VEHICLE

The present application is the U.S. national phase of PCT Application PCT/EP2020/079614 filed on Oct. 21, 2020, which claims priority of German patent application No. 102020103851.8 filed on Feb. 14, 2020, which is incorporated herein by reference in its entirety.

TECHNICAL FIELD

The disclosure relates to a method for providing accident parameters to a person outside a vehicle after an accident involving the vehicle. The disclosure also relates to a computer-readable medium for providing accident parameters to a person outside a vehicle following an accident involving the vehicle, a system for providing accident parameters to a person outside a vehicle following an accident involving the vehicle, and a vehicle comprising the system for providing accident parameters to a person outside a vehicle after an accident involving the vehicle.

BACKGROUND

It is known from the prior art to transmit data on the severity of an accident from the vehicle to a call center server by means of an emergency call in the event of an accident. However, the call center server does not, or not completely, forward the accident severity data to emergency services. The statutory emergency call comprises a defined, minimum data packet which does not have any free parameters that would enable data on the severity of an accident to be transmitted to the emergency services via the statutory emergency call in the event of an accident.

It is therefore an object to efficiently provide accident parameters to one or more persons outside the vehicle at an accident site. In particular, one object of the disclosure is to efficiently provide accident parameters at an accident site to one or more persons outside the vehicle, such as emergency service personnel or passers-by, in compliance with data protection regulations.

SUMMARY

The above-stated object is achieved by the features and embodiments described herein.

According to a first aspect, a method provides accident parameters to a person outside a vehicle after an accident involving the vehicle. The method for providing accident parameters may be a computer-implemented method and/or a control-unit-implemented method. The person outside the vehicle may be an emergency service worker or a passer-by near the vehicle accident site. The accident parameters are preferably made available to the person outside the vehicle by means of the vehicle. The vehicle can be a conventional, partially, highly, or fully automatically driven vehicle. In particular, the vehicle can be a motor vehicle. An accident parameter can be a number, text, a graphic, an image, and/or a multimedia object.

The method comprises ascertaining a first accident parameter that is representative of an accident severity and/or an accident consequence severity by means of a control unit of the vehicle. Preferably, the first accident parameter can be representative of the accident severity and/or the accident consequence severity for the vehicle. In addition or alternatively, the first accident parameter may be representative of the severity of the accident and/or the accident consequence severity for one or more occupants of the vehicle. The method comprises determining a display device of the vehicle that can display the first accident parameter and/or further accident parameters following the accident. The display device may be arranged in the interior of the vehicle or on the exterior of the vehicle. It is preferable to specify more than one display device, for example, two, three, and/or four display devices. For each display device, it can be determined whether the first accident parameter can be displayed by the respective display unit without errors.

The method comprises making the first accident parameter available on the determined display device of the vehicle. The method further comprises ascertaining a second accident parameter that is representative of the accident severity and/or the accident consequence severity by means of the control unit of the vehicle. Preferably, the second accident parameter can be representative of the accident severity and/or the accident consequence severity for the vehicle. In addition or alternatively, the second accident parameter may be representative of the accident severity and/or the accident consequence severity for one or more occupants of the vehicle. The method also comprises receiving a release signal for the second accident parameter via an input interface of the vehicle from the person outside the vehicle following the vehicle accident, verifying the release signal for the second accident parameter by means of the control unit of the vehicle, and providing the second accident parameter on the determined display device of the vehicle if the release signal was successfully verified by the control unit of the vehicle. In addition or alternatively, the second accident parameter can be provided on another display device of the vehicle. For this purpose, the method can determine an additional display unit of the vehicle that can display the second accident parameter without errors.

The method can advantageously provide different accident parameters on a display device of the vehicle following an accident involving the vehicle. The vehicle provides the emergency services with the necessary information for rescuing or providing medical treatment to the vehicle occupant(s) on site. The displayed accident parameters can be used to determine more efficiently what subsequent form of medical rescue and/or medical treatment to provide to the occupants. In order to protect the privacy of the occupants, accident parameters can only be provided after receiving the release signal. This means that the vehicle can selectively provide specific, predefined accident parameters only to emergency services personnel. This prevents the accident parameters of the vehicle that are provided from being misused by third parties. The privacy of the occupants can thus be efficiently protected.

According to an advantageous embodiment, the method can comprise receiving a request message to transmit the first accident parameter and/or the second accident parameter from a mobile terminal of the person outside the vehicle via a communication interface of the vehicle by means of the vehicle, transmitting the first accident parameter and/or the second accident parameter from the vehicle to the mobile terminal via the communication interface of the vehicle, receiving the first accident parameter and/or the second accident parameter from the vehicle by means of the mobile terminal, and providing the first accident parameter and/or the second accident parameter to the person outside the vehicle by means of the mobile terminal. This allows the person outside the vehicle to efficiently query the accident parameters. This is particularly advantageous if there is no functioning display device in the vehicle to provide the accident parameters.

In accordance with a further, advantageous design, the method can also comprise verifying whether the first accident parameter and/or the second accident parameter have been correctly transmitted by the mobile terminal via an emergency call signal from the vehicle. If the first accident parameter and/or the second accident parameter were not transmitted or were incorrectly transmitted via the emergency call signal of the vehicle, the method can provide a signal representative of an unsuccessful verification of the first accident parameter and/or the second accident parameter to the person outside the vehicle by means of the mobile terminal. If the first accident parameter and/or the second accident parameter have been correctly transmitted via the emergency call signal of the vehicle, the method can provide a signal representative of a successful verification of the first accident parameter and/or the second accident parameter to the person outside the vehicle by means of the mobile terminal. This allows efficient verification of data transmitted via the statutory or non-statutory emergency call using the accident parameters of the vehicle. An incorrect and/or failed transmission of the data via the emergency call can thus be efficiently detected.

In accordance with a further, advantageous embodiment, the first accident parameter and/or the second accident parameter can be provided on the determined display device of the vehicle depending on a distance of the person outside the vehicle from the vehicle. This allows the accident parameters to be efficiently provided by means of the vehicle. The energy consumption of the vehicle, in particular the display device or display devices of the vehicle, can be efficiently reduced if the accident parameters are only made available to persons outside the vehicle who are within a specified distance from the vehicle.

In accordance with a further, advantageous embodiment the release signal from the mobile device of the person outside the vehicle can be transmitted to the vehicle via the communication interface of the vehicle, and/or the request message for the transmission of the first accident parameter and/or the second accident parameter can comprise the release signal. This enables the second accident parameter to be efficiently released by the person outside the vehicle.

In accordance with a further advantageous design, the second accident parameter can be provided on the determined display unit of the vehicle depending on a distance of the mobile terminal of the person outside the vehicle from the vehicle. This means the second accident parameter can be provided in an energy-efficient manner.

According to another aspect, a computer-readable medium provides accident parameters to a person outside a vehicle following an accident involving the vehicle, wherein the computer-readable medium comprises instructions that, when executed on a computer or a control unit, carry out the method described above.

According to a further aspect, a system provides accident parameters to a person outside a vehicle following an accident involving the vehicle, wherein the system is designed to carry out the method described above.

According to another aspect, a vehicle includes the system described above for providing accident parameters to a person outside a vehicle after an accident involving the vehicle.

Additional features arise from the claims, the figures, and the description of the figures. All the features and feature combinations cited in the description above, and the features and feature combinations cited in the description of the figures below and/or shown in the figures alone are applicable not only in the respective combination indicated, but also in other combinations or else in isolation.

BRIEF DESCRIPTION OF THE DRAWINGS

In the following, a preferred exemplary embodiment is described by reference to the attached drawing. This will reveal further details, preferred embodiments and extensions of the invention. Taken individually, FIG. 1 shows a schematic drawing of an exemplary method for providing accident parameters to a person outside a vehicle after an accident involving the vehicle.

DETAILED DESCRIPTION

In detail, FIG. 1 shows an exemplary method 100 for providing accident parameters to a person outside a vehicle after an accident involving the vehicle. In general, accident parameters can be representative of the severity of an accident or of the severity of the consequences of an accident.

The severity of the accident can be defined as the stress exerted on a vehicle and/or on the person. Examples of accident parameters of the accident severity are: collision speed or impact speed, vectorial speed change $\Delta v$, energy equivalent speed, specific accident power, a combination of the vectorial speed change with a mean deceleration, intrusion, depth of intrusion, intrusion speed, mean acceleration and/or deceleration, degree of damage, impulse, impulse change, impulse direction, relative speed, impetus of impact, direction of impact, energy difference before and/or after the accident, and/or rollover.

The accident consequence severity can be defined as the sum of material damage to the vehicle and its surroundings and/or personal injury. Examples of accident parameters of the severity of the accident consequences are: probability of injury, probability of injury to a region and/or part of the body, probability of injury severity, probability of an AIS (Abbreviated Injury Scale), probability of a MAIS (Maximum AIS), probability of a MAIS3+ (MAIS greater than 3), and/or an ISS (Injury Severity Score).

The method 100 can determine 102 a first accident parameter that is representative of the severity of the accident and/or the severity of the accident consequences of the vehicle by means of a vehicle control unit. The method 100 can determine a display device 104 of the vehicle, which can display the first accident parameter and/or a second accident parameter after the accident, preferably without errors. For example, determining the display device can comprise retrieving a status value of the display device, wherein the status value of the display device is representative of the display device functioning without error. For example, the display device can be determined depending on damage to the vehicle after the accident.

The method 100 can provide 106 the first accident parameter on the determined display device of the vehicle. The first accident parameter on the determined display device can be provided temporarily, depending on events such as a distance of a person outside the vehicle from the vehicle, and/or permanently.

The method 100 can determine 108 a second accident parameter that is representative of the severity of the accident and/or the severity of the accident consequences of the vehicle by means of the vehicle control unit. In addition, the method 100 can receive 110 a release signal for the second accident parameter from the person outside the vehicle after the accident involving the vehicle via a communication interface of the vehicle, for example an NFC radio interface, and/or an input interface of the vehicle, for example a touch-sensitive input via a touch-sensitive input device. The vehicle can verify 112 the release signal for the second accident parameter by means of the control unit of the vehicle and provide 114 the second accident parameter on the determined display unit of the vehicle if the release signal has been successfully verified 112 by the control unit of the vehicle.

It is advantageous that the vehicle can efficiently provide accident parameters to a person outside the vehicle. The release signal means that accident parameters can only be provided to authorized persons outside the vehicle, thus efficiently protecting the privacy of the vehicle occupants.

LIST OF REFERENCE SIGNS 100 method
102 determining a first accident parameter
104 determining a display device
106 providing the first accident parameter
108 determining a second accident parameter
110 receiving a release signal
112 verifying the release signal
114 providing the second accident parameter

The invention claimed is:

1. A method for providing accident parameters to a person outside a vehicle after an accident involving the vehicle, the method comprising:
   ascertaining, using a control unit of the vehicle, a first accident parameter that is representative of at least one of a group consisting of an accident severity and an accident consequence severity;
   determining a display device of the vehicle that can display the first accident parameter following the accident;
   providing the first accident parameter on the determined display device of the vehicle;
   ascertaining, using the control unit of the vehicle, a second accident parameter that is representative of at least one of the group consisting of the accident severity and the accident consequence severity;
   receiving a release signal for the second accident parameter via an input interface of the vehicle following the accident involving the vehicle;
   verifying the release signal for the second accident parameter by means of the control unit of the vehicle; and
   providing the second accident parameter on the determined display device of the vehicle if the release signal was successfully verified by the control unit of the vehicle.

2. The method as claimed in claim 1, the method further comprising:
   receiving a request message to transmit at least one of the first accident parameter and the second accident parameter from a mobile terminal of the person outside the vehicle via a communication interface of the vehicle by means of the vehicle;
   transmitting the at least one of the first accident parameter and the second accident parameter from the vehicle to the mobile terminal via the communication interface of the vehicle;
   receiving the at least one of the first accident parameter and the second accident parameter from the vehicle by means of the mobile terminal; and
   providing the at least one of the first accident parameter and the second accident parameter to the person outside the vehicle by means of the mobile terminal.

3. The method as claimed in claim 2, wherein the request message for the transmission of the at least one of the first accident parameter and the second accident parameter comprises the release signal.

4. The method as claimed in claim 2, wherein the release signal is transmitted from the mobile device of the person outside the vehicle to the vehicle via the communication interface of the vehicle.

5. The method as claimed in claim 4, wherein the second accident parameter is provided on the determined display unit of the vehicle depending on a distance of the mobile terminal of the person outside the vehicle from the vehicle.

6. The method as claimed in claim 4, the method further comprising:
   verifying whether the at least one of the first accident parameter and the second accident parameter have been correctly transmitted by the mobile terminal via an emergency call signal from the vehicle; and
   if the at least one of the first accident parameter and the second accident parameter were not transmitted or were transmitted incorrectly via the emergency call signal of the vehicle,
      then providing a signal that is representative of an unsuccessful verification of the at least one of the first accident parameter and the second accident parameter to the person outside the vehicle by means of the mobile terminal;
   if the at least one of the first accident parameter and the second accident parameter were correctly transmitted via the emergency call signal of the vehicle,
      then providing a signal that is representative of a successful verification of the at least one of the first accident parameter and the second accident parameter to the person outside the vehicle by means of the mobile terminal.

7. The method as claimed in claim 6, wherein the release signal is transmitted from the mobile device of the person outside the vehicle to the vehicle via the communication interface of the vehicle.

8. The method as claimed in claim 6, wherein the request message for the transmission of the first accident parameter and/or the second accident parameter comprises the release signal.

9. The method as claimed in claim 2, wherein the request message for the transmission of the first accident parameter and/or the second accident parameter comprises the release signal.

10. The method as claimed in claim 1, wherein at least one of the first accident parameter and the second accident parameter are provided on the determined display device of the vehicle depending on a distance of the person outside the vehicle from the vehicle.

11. The method as claimed in claim 1, wherein the second accident parameter is provided on the determined display unit of the vehicle depending on a distance of the mobile terminal of the person outside the vehicle from the vehicle.

12. The method as claimed in claim 1, wherein the release signal is transmitted from the mobile device of the person outside the vehicle to the vehicle via the communication interface of the vehicle.

13. A computer-readable medium for providing accident parameters to a person outside a vehicle following an accident involving the vehicle, wherein the computer-readable medium comprises instructions that, when executed on a computer or a control unit, carry out the method as claimed in claim 1.

14. The computer-readable medium as claimed in claim 13, wherein the computer-readable medium further comprises instructions that, when executed on a computer or a control unit, further carry out:
- receiving a request message to transmit at least one of the first accident parameter and the second accident parameter from a mobile terminal of the person outside the vehicle via a communication interface of the vehicle by means of the vehicle;
- transmitting the at least one of the first accident parameter and the second accident parameter from the vehicle to the mobile terminal via the communication interface of the vehicle;
- receiving the at least one of the first accident parameter and the second accident parameter from the vehicle by means of the mobile terminal; and
- providing the at least one of the first accident parameter and the second accident parameter to the person outside the vehicle by means of the mobile terminal.

15. The computer-readable medium as claimed in claim 14, wherein the second accident parameter is provided on the determined display unit of the vehicle depending on a distance of the mobile terminal of the person outside the vehicle from the vehicle.

16. A system for providing accident parameters to a person outside a vehicle following an accident involving the vehicle, wherein the system is designed to carry out the method as claimed in claim 1.

17. The system for providing accident parameters as claimed in claim 16, wherein the system is further designed to carry out:
- receiving a request message to transmit at least one of the first accident parameter and the second accident parameter from a mobile terminal of the person outside the vehicle via a communication interface of the vehicle by means of the vehicle;
- transmitting the at least one of the first accident parameter and the second accident parameter from the vehicle to the mobile terminal via the communication interface of the vehicle;
- receiving the at least one of the first accident parameter and the second accident parameter from the vehicle by means of the mobile terminal; and
- providing the at least one of the first accident parameter and the second accident parameter to the person outside the vehicle by means of the mobile terminal.

18. The system for providing accident parameters as claimed in claim 16, wherein the second accident parameter is provided on the determined display unit of the vehicle depending on a distance of the mobile terminal of the person outside the vehicle from the vehicle.

19. A vehicle comprising the system for providing accident parameters to a person outside a vehicle after an accident involving the vehicle, as claimed in claim 16.

20. The method as claimed in claim 1, wherein receiving the release signal for the second accident parameter via the input interface of the vehicle further comprises receiving the release signal through the input interface of the vehicle from the person outside the vehicle, and wherein the input interface of the vehicle is a communication interface of the vehicle.

* * * * *